(12) United States Patent
Itoi

(10) Patent No.: US 7,289,446 B2
(45) Date of Patent: Oct. 30, 2007

(54) CONTROLLER AREA NETWORK (CAN) COMMUNICATION DEVICE

(75) Inventor: Makoto Itoi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 980 days.

(21) Appl. No.: 10/378,918

(22) Filed: Mar. 5, 2003

(65) Prior Publication Data

US 2004/0042401 A1 Mar. 4, 2004

(30) Foreign Application Priority Data

Sep. 4, 2002 (JP) ............................. 2002-258674

(51) Int. Cl.
*G01R 31/08* (2006.01)
(52) U.S. Cl. ...................... 370/235; 370/351; 370/401; 701/35; 701/36; 701/49
(58) Field of Classification Search .................. 710/35, 710/36, 49, 107, 305; 370/351, 401
See application file for complete search history.

(56) References Cited

U.S. PATENT DOCUMENTS

| | | | |
|---|---|---|---|
| 5,854,454 A * | 12/1998 | Upender et al. ............. | 187/247 |
| 6,553,297 B2 * | 4/2003 | Tashiro et al. ............... | 701/48 |
| 6,845,416 B1 * | 1/2005 | Chasmawala et al. ...... | 710/107 |
| 6,865,460 B2 * | 3/2005 | Bray et al. .................... | 701/36 |
| 6,982,983 B2 * | 1/2006 | Ota et al. ..................... | 370/401 |
| 2001/0041956 A1 * | 11/2001 | Wong et al. ................... | 701/36 |
| 2002/0172211 A1 * | 11/2002 | Nichols ........................ | 370/412 |
| 2003/0002681 A1 * | 1/2003 | Fredriksson ................ | 380/278 |

FOREIGN PATENT DOCUMENTS

| | | |
|---|---|---|
| JP | 11-163899 | 6/1999 |
| JP | 2001-084001 | 3/2001 |
| JP | 2001-136181 | 5/2001 |

* cited by examiner

*Primary Examiner*—Wing Chan
*Assistant Examiner*—Andrew C. Lee
(74) *Attorney, Agent, or Firm*—Sughrue Mion Pllc.

(57) ABSTRACT

Provided is a control area network (CAN) communication device formed such that a plurality of nodes are connected to communication channels in the CAN. Each of the nodes includes a transmitting/receiving unit for transmitting and receiving data including a CAN-ID field formed of bits containing function information, an ID-setting unit for setting predetermined function information to the bits of the CAN-ID field contained in the data transmitted from the transmission/reception unit, and an ID-analyzing unit for analyzing the predetermined function information set in the CAN-ID field. The ID-setting unit groups the predetermined function information in units of a predetermined function, assigns a data-transmission priority, assigns a general function group ID, and assigns a communication category code ID used to identify a communication content to each item of the grouped predetermined function information to be set to part of the bits of the CAN-ID field.

9 Claims, 11 Drawing Sheets

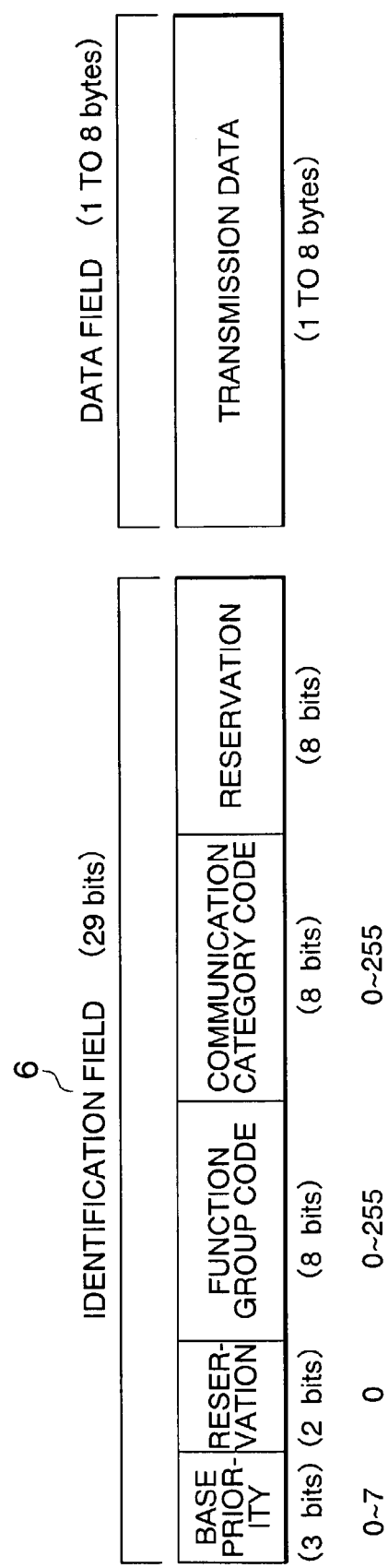

FIG.4

A PRE-FUNCTIONAL-DISINTEGRATION REMOTE CONTROL

| NAME (PHYSICAL NODE NAME) | FUNCTION NAME | BASE PRIORITY | FUNCTION GROUP ID | COMMUNICATION CATEGORY | COMMUNICATION CATEGORY CODE ID |
|---|---|---|---|---|---|
| STEERING | STEERING | 3 | H'10 | TARGET STEERING ANGLE | H'10 |
| ENGINE ECU | ENGINE CONDITION | 3 | H'11 | ENGINE R.P.M. | H'10 |
| REMOTE CONTROL | SHIFT+THROTTLE REMOTE CONTROL | 3 | H'12 | TARGET SHIFT POSITION+ TARGET THROTTLE OPENING DEGREE | H'10 |
| STEERING ACTUATOR ECU | STEERING ACTUATOR DRIVING | 3 | H'13 | CURRENT STEERING ANGLE | H'10 |
| THROTTLE ACTUATOR ECU | THROTTLE ACTUATOR DRIVING | 3 | H'14 | CURRENT THROTTLE OPENING | H'10 |

B POST-FUNCTIONAL-DISINTEGRATION REMOTE CONTROL

| NAME (PHYSICAL NODE NAME) | FUNCTION NAME | BASE PRIORITY | FUNCTION GROUP ID | COMMUNICATION CATEGORY | COMMUNICATION CATEGORY CODE ID |
|---|---|---|---|---|---|
| REMOTE CONTROL | SHIFT+THROTTLE REMOTE CONTROL | 3 | H'12 | TARGET SHIFT POSITION+ TARGET THROTTLE OPENING DEGREE | H'10 |
|  | THROTTLE REMOTE CONTROL | ← | ← | TARGET THROTTLE OPENING | H'12 |
|  | SHIFT REMOTE CONTROL | ← | ← | TARGET SHIFT POSITION | H'14 |
|  | THROTTLE+STEERING REMOTE CONTROL | ← | ← | TARGET THROTTLE OPENING+TARGET STEERING POSITION | H'16 |
|  | STEERING+SHIFT REMOTE CONTROL | ← | ← | TARGET STEERING ANGLE+ TARGET SHIFT POSITION | H'18 |
|  | STEERING+THROTTLE+SHIFT REMOTE CONTROL | ← | ← | TARGET STEERING ANGLE+ TARGET THROTTLE OPENING+ TARGET SHIFT POSITION | H'1A |

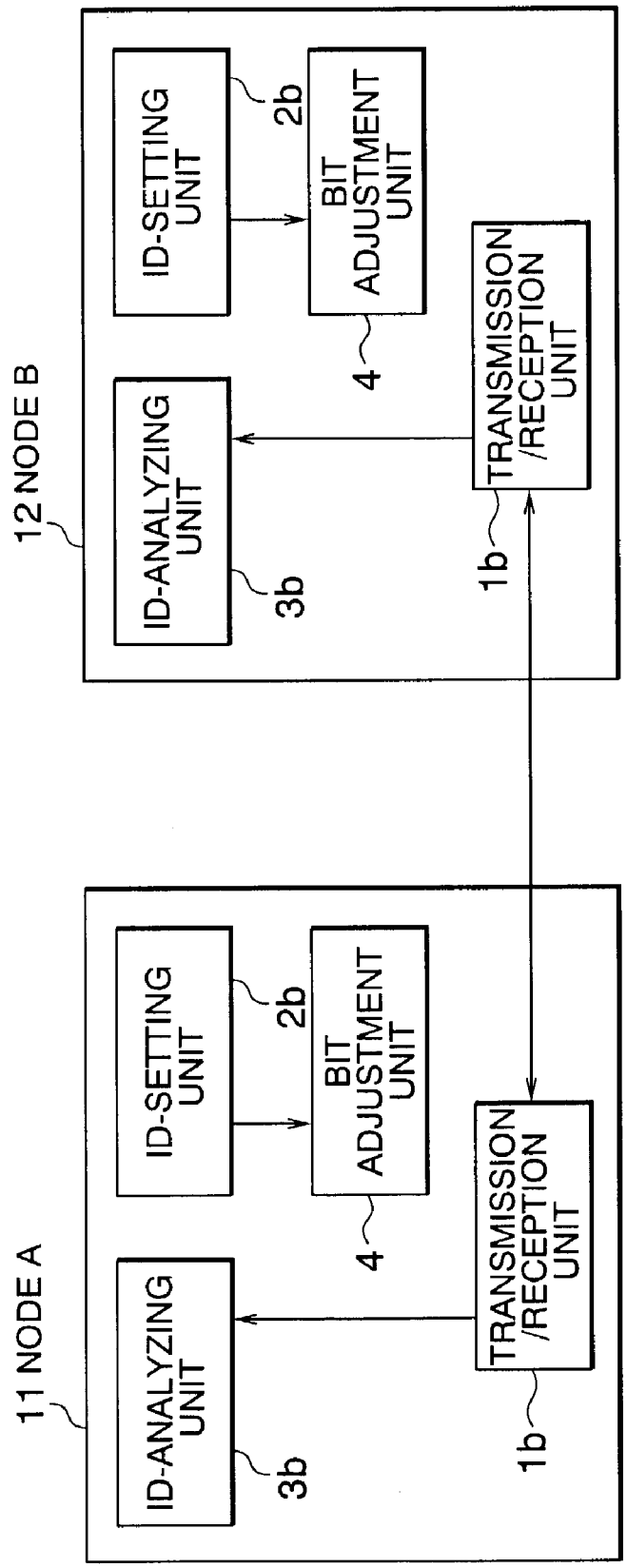

FIG.9

| NAME (PHYSICAL NODE NAME) | FUNCTION NAME | COMMUNICATION CATEGORY | ID |
|---|---|---|---|
| STEERING | STEERING | TARGET STEERING ANGLE | H'1000 |
| ENGINE ECU | ENGINE CONDITION | ENGINE R.P.M. | H'2000 |
| SHIFT REMOTE CONTROL | SHIFT REMOTE CONTROL | TARGET SHIFT POSITION | H'3000 |
| THROTTLE REMOTE CONTROL | THROTTLE REMOTE CONTROL | TARGET THROTTLE OPENING DEGREE | H'4000 |
| STEERING ACTUATOR ECU | THROTTLE+STEERING REMOTE CONTROL | CURRENT STEERING ANGLE | H'5000 |
| THROTTLE ACTUATOR ECU | STEERING+SHIFT REMOTE CONTROL | CURRENT THROTTLE OPENING | H'6000 |

CONTROLLER AREA NETWORK (CAN) COMMUNICATION DEVICE

BACKGROUND OF THE INVENTION

1. Field of the Invention

The present invention relates to a controller area network (CAN) communication device improved in efficiency.

2. Description of the Related Art

In the field oft for example, automobiles, which is amid technological trends toward increase in modularized devices, intelligent devices, and devices with reduced harnesses, industries have started rapidly employing device controls using serial communication schemes represented by, for example, a controller area network (CAN) communication scheme.

In particular, in the field of automobiles, a device connected via communication lines and thereby controlled is substantially fixed at a development stage, and no case occurs in which the device connection is changed at least during the stages of production and postproduction.

Thus, in the serial communication represented by the CAN communication mounted on an automobile, IDs individually indicating, for example, device identifications, priorities of communication data, the contents of communication data, are arbitrarily coded and determined in a design stage.

FIG. 9 shows examples of function IDs of, for example, a desired steering angle, which are assigned using 16 bits of 29-bit ID fields according to CAN 2.0B specifications. An ID field other than the 16-bit ID field is allocated to a node ID (ID that physically identifies the node).

However, according to the method of arbitrary assigning codes of IDs as shown in FIG. 9, although a sufficient number of free codes were available in an initial development stage, suitable free codes are running short during advancement of developments.

"Priorities (of data communication)" are semantically defined for many protocol IDs, such as CAN-IDs. Thus, probability is high in that a suitable free ID is already unavailable while assignment of a code of a high-priority ID is desired in a latter stage of development.

Another incidence can also occur. Suppose when serial codes are already assigned to ID(A1) to ID(A3), assignment of a code of ID(A2) having a priority semantically higher than that of a code of ID(A3) and semantically lower than that of a code of ID(A1) is attempted. Even in this case, since no free codes exist between ID(A1) and ID(A3), a desired code corresponding to the priority cannot be assigned to ID(A2).

In addition, according to the scheme of coding an ID for each physical unit, a new ID must be assigned when a physical unit is developed in future by integration or disintegration of functions of the physical unit of the current version. Thus, if a desired ID corresponding to the priority is not preserved free, the code assignment would fail.

In the example shown in FIG. 9, shift remote control is coded "H'3000", and throttle remote control is coded "H'4000". Suppose the shift remote control and the throttle remote control are integrated, and a shift+throttle remote control is thus created as a new function. In this case, the new shift+throttle remote control can be coded "H'2500" representing a priority higher than the priorities of the shift remote control and the throttle remote control. Further, suppose a steering remote control function is integrated into the aforementioned function, and a shift+throttle+steering remote control is thus created as a new function. In this case, the shift remote control and the throttle remote control can be coded "H'500" representing a priority higher than the priority of the steering remote control.

However, it is obvious that the coding system would fail when functions are thus repeatedly added.

As described above, according to the CAN specifications, the CAN-ID semantically represents the communication priority. Concurrently, the CAN-ID semantically represents a data identifier in application. Thus, once an ID has been assigned, it is difficult to change the priority in order to maintain data compatible with another system. For example, while "H'3000" is assigned to an ID for a shift remote control, "H'3000" is assigned as well to an ID for a shift remote control in a different system. Thus, ID specifications must be changed in all the relevant systems to change the priority.

In addition, in a network already in operation, a case can occur in which consecutive arbitration losses are caused while communication is carried out using a specific ID, establishing no proper communication. Although this is avoidable with respect to a design, this leads to a problem, particularly, in the field of shipbuilding. An engine manufacturer in this field delivers only engines, not finished ships; therefore, a boat-builder or a user, rather than the engine manufacturer, has choices for the system configuration. This makes it difficult for the engine manufacturer to control the system configuration.

FIG. 10 is a flowchart of data transmission in a conventional CAN communication device. In the flowchart, when a case occurs, in which data is to be transmitted at a time interval of 10 (msec), the data is transmitted through a routine that is started with step S101 at a periodic interval of 10 (msec).

First, at step S102, the routine determines as to whether previously transmitted data is in a transmission retry performed as a CAN chip function. Next, if the data is not in the retry, the data of the present instance is transmitted at step S103. If the data is in the retry, the routine executes nothing but terminates at step S104. Thereafter, a routine similar to the 10(msec)-regular-interval routine is iterated. If the retry continues in the routine, this data is not transmitted forever.

Thus, the control of the system configuration is difficult for an engine manufacturer, particularly, in the field of shipbuilding. This also makes it difficult for the manufacturer to estimate the total amount of traffic (communication amount). Thus, depending on the system configuration, a traffic overflow may occur, resulting in causing communication failure.

Next, FIG. 11 is a flowchart of conventional gateway transfer operation. Referring to FIG. 11, the gateway transfer operation starts with step S111 in which a gateway node receives data via a CAN 1ch Bus.

At step S112, the received data is filtered through a hardware function provided in a CAN chip, and is then stored in a buffer provided in the CAN chip. In many CAN chips, the number of types of filtering functions provided in the form of hardware is only three at maximum. Thus, filtering for all the IDs cannot be implemented using hardware.

At step S113, a function group ID is either "H'3000" or "H'4000", the received data is transmitted via a CAN 2ch Bus at step S114. However, at step S113, if the function group ID is neither "H'3000" nor "H'4000", the received data is discarded at step S115.

Finally, at step S116, the series of the gateway transfer operation steps terminates.

Thus, the limitation is imposed on use of the hardware filtering functions of the CAN chip. This arises a problem when a large number of IDs are to be transmitted. Specifically, since all the large number of IDs must be checked, the software load is extremely increased.

SUMMARY OF THE INVENTION

The present invention is proposed to solve the problems described above. An object of the present invention is to realize a controller area network (CAN) communication device that enables IDs to be securely assigned without causing an ID coding system to fail and that enables communication to be securely guaranteed.

According to the present invention, there is provided a controller area network (CAN) communication device formed such that a plurality of nodes are connected to communication channels in a controller area network, each of the nodes including: a transmission/reception unit for transmitting and receiving data including a CAN-ID field formed of bits containing function information; an ID-setting unit for setting predetermined function information to the bits of the CAN-ID field contained in the data transmitted from the transmission/reception unit; and an ID-analyzing unit for analyzing the predetermined function information set in the CAN-ID field included in the data when the data containing the predetermined function information set by the ID-setting unit has been received by the transmission/reception unit. The ID-setting unit groups the predetermined function information in units of a predetermined function, assigns a data-transmission priority, assigns a general function group ID, and assigns a communication category code ID used to identify a communication content to each item of the grouped predetermined function information to be set to part of the bits of the CAN-ID field.

BRIEF DESCRIPTION OF THE DRAWINGS

In the accompanying drawings:

FIG. 3 shows a bit configuration of a CAN-ID transmitted and received between transmission/reception units 1a of the nodes in the CAN communication device according to the first embodiment of the present invention;

FIG. 4 shows example IDs created according to the CAN-ID bit configuration of the CAN communication device according to the first embodiment of the present invention;

FIG. 5 shows intra-node configurations of a CAN communication device according to a second embodiment of the present invention;

FIG. 9 shows coding examples of function IDs such as a desired steering angle in a conventional CAN communication device;

DETAILED DESCRIPTION OF THE PREFERRED EMBODIMENTS

First Embodiment

Figure 1:
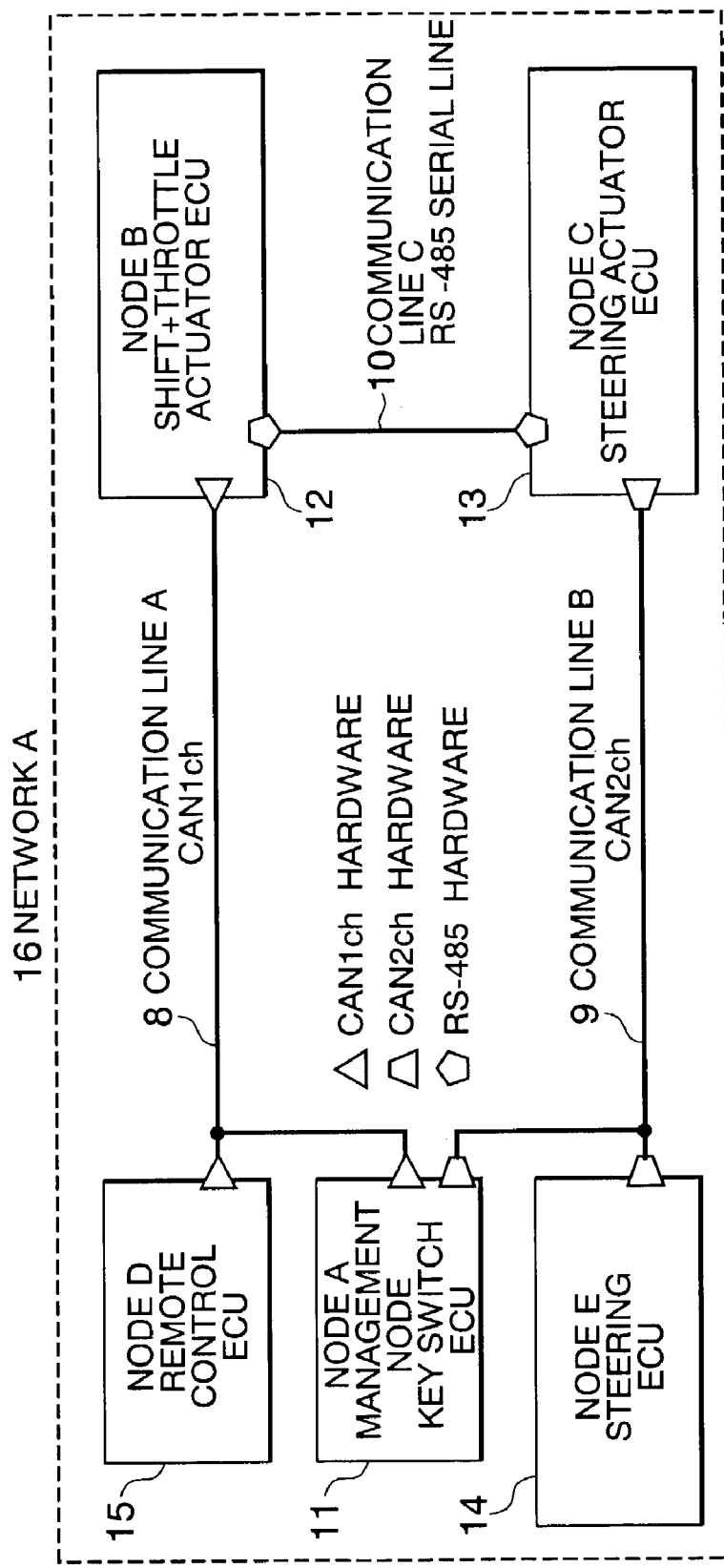
FIG. 1 shows a network configuration of a controller area network (CAN) communication device according to a first embodiment of the present invention.

FIG. 1 shows a network configuration of a controller area network (CAN) communication device according to a first embodiment of the present invention. Hereinbelow, the configuration shown in FIG. 1 will be described.

Numeral 8 denotes a communication line A (CAN1ch), numeral 9 denotes a communication line B (CANa2ch), numeral 10 denotes a communication line C (RS-485 serial line), numeral 11 denotes a key switch engine control unit (ECU), numeral 12 denotes a shift+throttle actuator ECU, numeral 13 denotes a steering actuator ECU, numeral 14 denotes a steering ECU, numeral 15 denotes a remote control ECU, and numeral 16 denotes a network A (CAN communication device) configured to include all the aforementioned elements.

A plurality of nodes are connected to each of the communication lines 8 to 10. The network A16 includes the shift+throttle actuator ECU 12, the steering actuator ECU 13, the steering ECU 14, and the remote control ECU 15.

The key switch ECU 11 is connected to the communication lines 8 and 9, and includes a data transmission/reception unit for transmitting data to or receiving data from the communication lines 8 and 9. The shift+throttle actuator ECU 12 is connected to the communication lines 8 and 10, and includes a data transmission/reception unit for transmitting data to or receiving data from the communication lines 8 and 10. In addition, the steering actuator ECU 13 is connected to the communication lines 9 and 10, and includes a data transmission/reception unit for transmitting data to or receiving data from the communication lines 9 and 10.

The network A16 is a link-formed as a loop through the remote control ECU 15, the shift+throttle actuator ECU 12, and the steering actuator ECU 13. The remote control ECU II serves as a management node, the remote control ECU 15 serves as a node of the communication line 8, and the steering ECU 14 serves as a node of the communication line 9.

Figure 2:
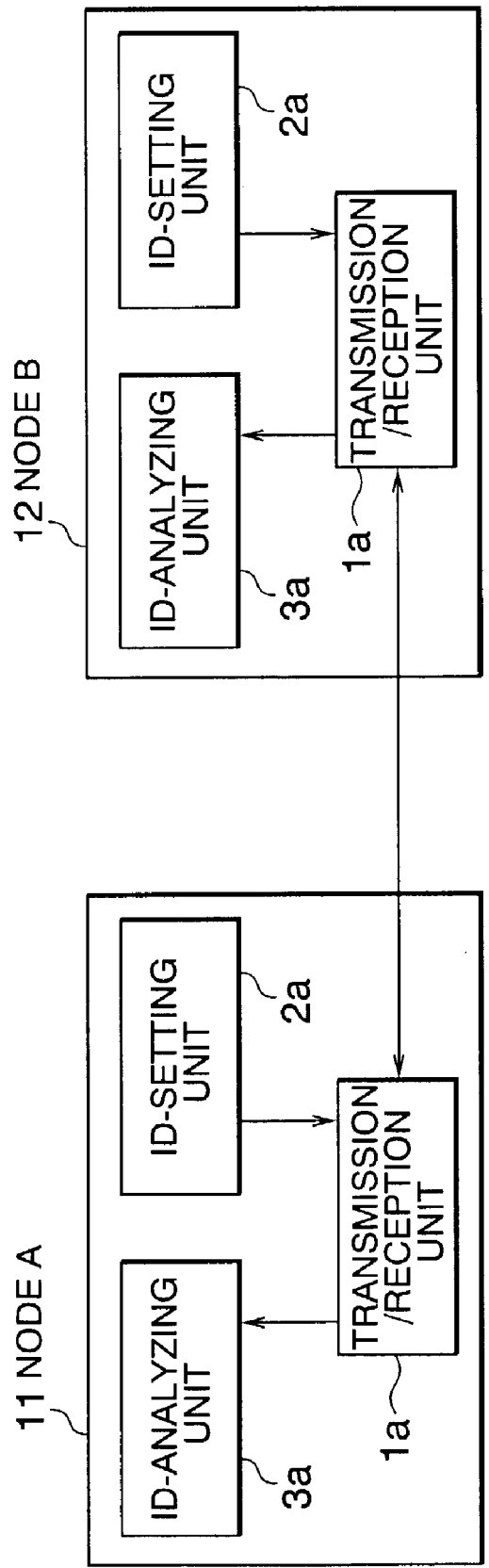
FIG. 2 shows intra-node configurations of the CAN communication device according to the first embodiment of the present invention.

FIG. 2 shows intra-node configurations of the CAN communication device according to the first embodiment of the present invention. The configurations are shown in FIG. 2 by way of example in which a node A of the key switch ECU 1 is connected to a node B of the shift+throttle actuator ECU 12.

Referring to FIG. 2, each of the nodes A and B includes a transmission/reception unit 1a, an ID-setting unit 2a, and an ID-analyzing unit 3a. The transmission/reception unit 1a transmits and receives data that contains a CAN-ID field configured of bits containing function information. The ID-setting unit 2a sets predetermined function information to bits of the CAN-ID field contained in the data that has been transmitted by the transmission/reception unit 1a. Upon receiving data to which the predetermined function information is set by the ID-setting unit 2a from the transmission/reception unit 1*a*, the ID-analyzing unit 3*a* analyzes the predetermined function information set to the CAN-ID contained in the data.

In addition, the ID-setting unit 2*a* groups a predetermined function information in units of a predetermined function and sets the information to part of the bits of the CAN-ID field, and assigns data-transmission priorities, assigning general function group IDs to the information. Thereby, the ID-setting unit 2*a* assigns communication category code IDs, which identify communication contents, to the individual grouped predetermined function information.

Next, FIG. 3 shows a bit configuration of a CAN-ID transmitted and received between transmission/reception units 1*a* of the nodes. An identification field (ID field) 6 has 29 bits in compliance with the CAN specifications. The first to third high-order bits are allocated to a base priority, and the fourth and fifth high-order bits are allocated for reservation. The sixth to thirteenth high-order bits are allocated to a function group code that represents a functional group. In addition, the fourteenth to twenty-first bits are allocated to a communication category code that represents a specific communication category group, and the remaining eight low-order bits are allocated for reservation.

FIG. 4 shows example IDs created according to the CAN-ID bit configuration shown in FIG. 3. In an ID table "A Pre-Functional-Disintegration Remote Control" in the upper portion of FIG. 4, a remote control concurrently has a shift remote control function and a throttle remote control function, and is designed with the ID code "H'1210" consisting of the function group ID "H'12" and the communication category code ID "H'10".

An ID table "B Post-Functional-Disintegration Remote Control" shows examples of new components produced by disintegration/integration of functions of the remote control and assigned new IDs.

n "B Post-Functional-Disintegration Remote Control", a shift+throttle remote control remains with the function group ID "H'12" and the communication category code ID "H'10" that are unchanged from those in shown the ID table "A Pre-Functional-Disintegration Remote Control". In addition, for example, the ID "H'1214" is assigned to a shift remote control, and the ID "H'1212" is assigned to a throttle remote control. Since a remote control function group ID is set to "H'12", general priorities in the coding system are not influenced with the aforementioned IDs.

As described above, according to the CAN communication device of the first embodiment of the present invention, IDs as shown in FIG. 3 are partly assigned to the function group code and the communication category code, and the IDs are generally prioritized in units of the function group. Thus, there is a low probability that a desired free priority code is not available. In addition, since the communication category code ID is assigned in units of the grouped functions, the coding method does not fail, even when a multifunction component is developed in the future.

Second Embodiment

FIG. 5 shows intra-node configurations of a CAN communication device according to a second embodiment of the present invention. Each of the configurations is dissimilar to that of the first embodiment in that it includes a bit adjustment unit 4. The configurations of FIG. 5 are shown by way of example in which a node A of a key switch ECU 11 is connected to a node B of a shift+throttle actuator ECU 12.

Referring to FIG. 5, an ID-setting unit 2*b* in each of the nodes A and B sets a base priority indicating a priority that is transmitted in units of grouped predetermined function information to part of the bits of a CAN-ID field 6. Each of the nodes A and B includes the bit adjustment unit 4. The bit adjustment unit 4 reduces the value of the bits representing the base priority assigned to grouped predetermined function information in one of items of data to which base priorities are set by the ID-setting unit 2*b*, thereby adjusting the communication priority to be higher. A transmission reception unit 1*b* transmits and receives data containing the base priority with the communication priority adjusted by the bit adjustment unit 4 to be higher.

Figure 6:
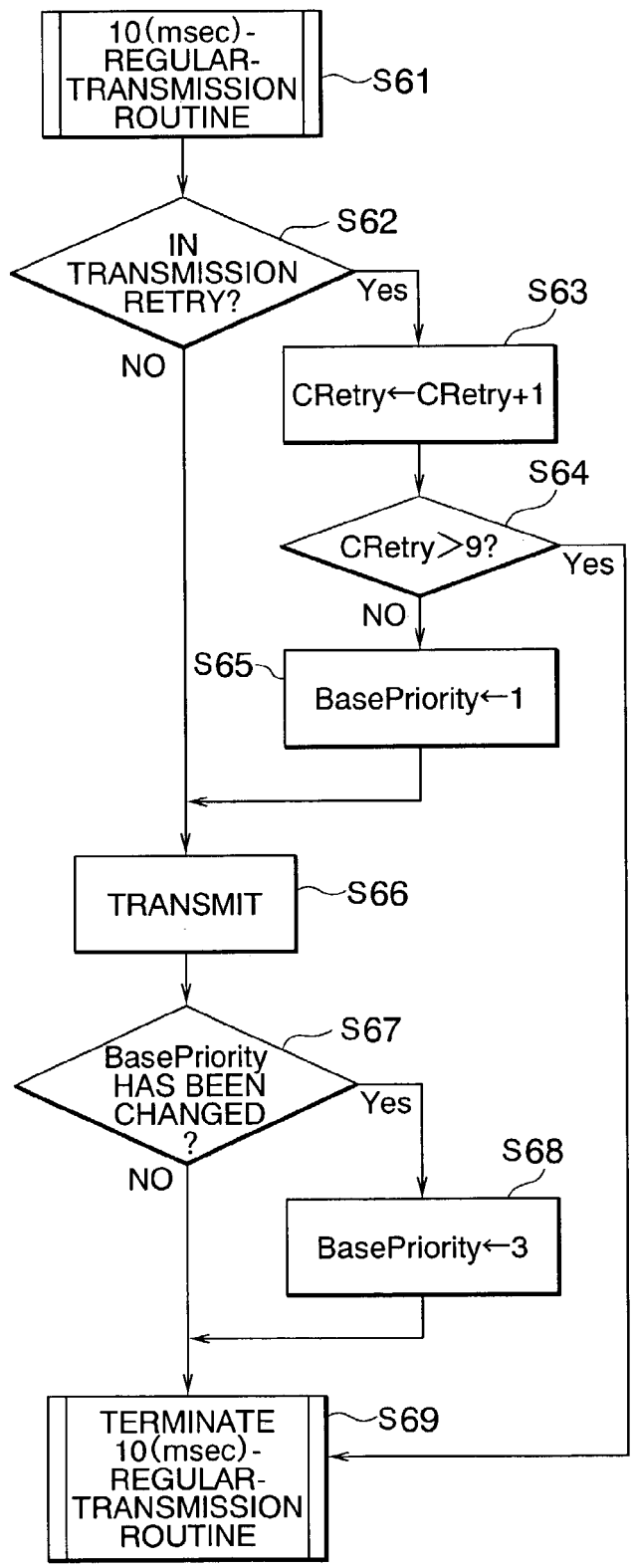
FIG. 6 is a flowchart showing data transmission operation of the CAN communication device according to the second embodiment of the present invention.

Next, FIG. 6 is a flowchart showing data transmission operation that guarantees the transmission at an interval of a worst value of 100 (msec) using the base priority bit when transmitting the remote control data shown in FIG. 3 at an interval of 10 (msec).

The data is transmitted through a routine that is started with step S61 and that is activated at a regular interval of 10 (msec). First, at step S62, the routine determines as to whether previously transmitted data is in a transmission retry performed as a CAN chip function. Next, if the data is not in the retry, the data of the present instance is transmitted at step S66.

However, if the data is in the retry, the routine causes a transmission retry counter CRetry to count up one at step S63. Subsequently, at step S64, when the value of the transmission retry counter CRetry has exceeded the value "9", that is, when transmission retries have occurred for 100(msec) in series, a base priority BasePriority of the data to be transmitted at the present instance is set to the value "1".

The remote control data is originally designed to have the base priority BasePriority of the value "3" as shown in FIG. 4. As described above, however, the base priority BasePriority is set to "1" to employ a value ensured to be higher than the priority of the design value "3" and to be always higher than priorities of any other IDs (in the example, an assumption is made that the higher the base priority, the smaller the numeric value).

Since the value of the base priority BasePriority is changed to "1" in step S65, the transmission according to the CAN specification is ensured in step S66.

When the value of the base priority BasePriority is changed at step S67, the value thereof is changed back to the design value "3" at step S68. Then, the 10(msec)-regular-transmission routine terminates at step 69.

When CRetry has not exceeded "9", that is, when transmission retries have occurred within 100 (msec), the routine executes nothing but terminates at step S64. A routine similar to the 10(msec)-regular-interval routine is iterated thereafter.

As described above, according to the CAN communication device of the second embodiment of the present invention, the ID-setting unit 2*b* sets the base priority indicating the priority that is transmitted in units of grouped predetermined function information to part of the bits of the CAN-ID field 6. Each of the nodes includes the bit adjustment unit 4. The bit adjustment unit 4 reduces the value of the bits representing the base priority assigned to grouped predetermined function information in one of items of data to which base priorities are set by the ID-setting unit 2*b*, thereby adjusting the communication priority to be higher. The transmission/reception unit 1*b* transmits and receives data containing the base priority with the communication priority adjusted by the bit adjustment unit 4 to be higher. For example, when data having the ID "A3", which is transmitted in units of 10 (msec), has lost consecutively 10 times in arbitration, the value of the base-priority bits is temporarily increased. Thus, communication in units of the worst value of 100 (msec) can be guaranteed. That is, since a high securablility can be guaranteed in the communication of grouped predetermined functions of which base priorities have been raised, consecutive arbitration losses can be prevented according to the base priority bit.

Third Embodiment

Figure 7:
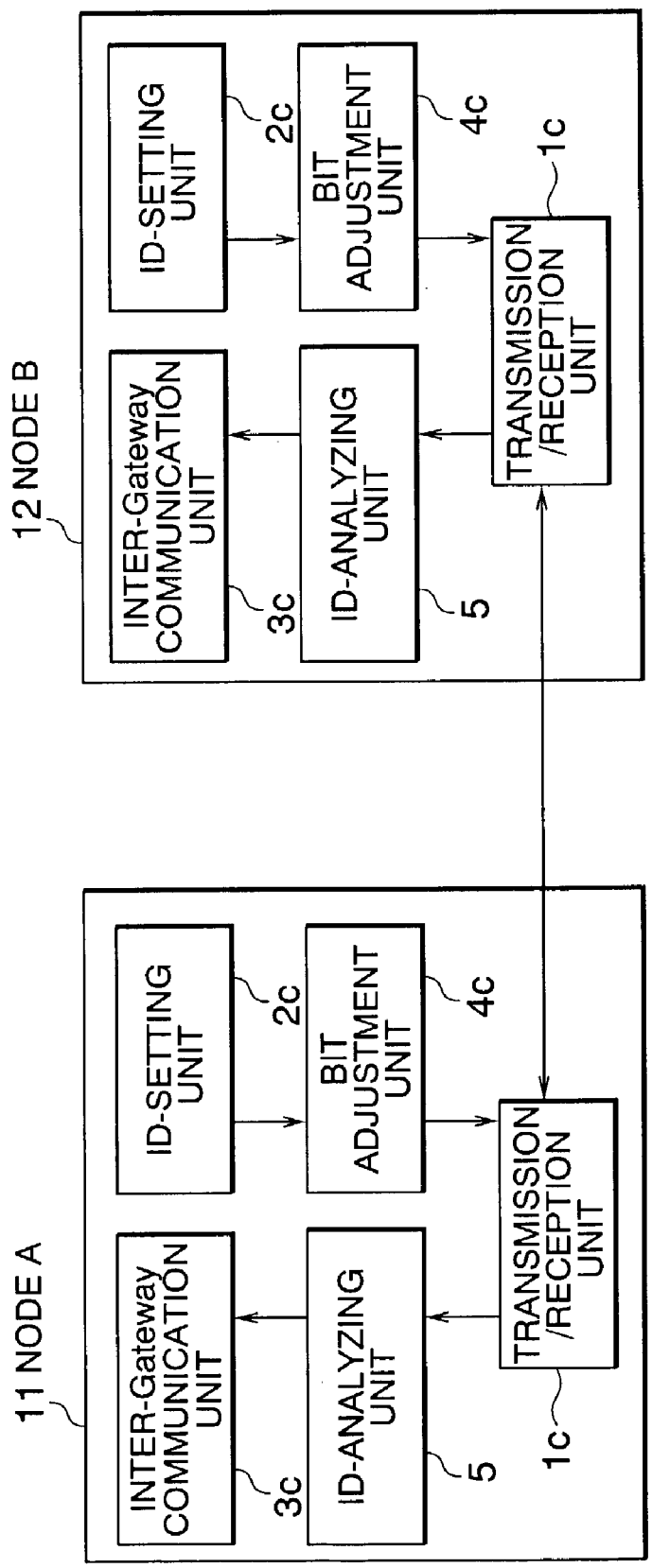
FIG. 7 shows intra-node configurations of a CAN communication device according to a third embodiment of the present invention.

FIG. 7 shows intra-node configurations of a CAN communication device according to a third embodiment of the present invention. Each of the configurations is dissimilar to that of the second embodiment in that the configuration includes an inter-gateway communication unit 3c. The configurations shown in FIG. 7 are shown by way of example in which a node A of a key switch ECU 11 is connected to a node B of a shift+throttle actuator ECU 12.

Referring to FIG. 7, each of the nodes A and B is a gateway node including at least a gateway function, and the gateway node is configured to include the following described hereinbelow. An ID-setting unit 2c sets inter-gateway transfer permission information indicating possibility/impossibility of inter-gateway data transfer in units of grouped predetermined function information to part of the bits of a CAN-ID field 6. A transmission/reception unit 1c transmits and receives data containing the inter-gateway transfer permission information set by the ID-setting unit 2c. An ID-analyzing unit 5 analyzes the inter-gateway transfer permission information contained in the data received from the transmission/reception unit 1c, thereby determining as to possibility/impossibility of communication. An inter-gateway communication unit 3c performs inter-gateway communication when the ID-analyzing unit 5 has output a determination result indicative of the possibility of the communication.

Figure 8:
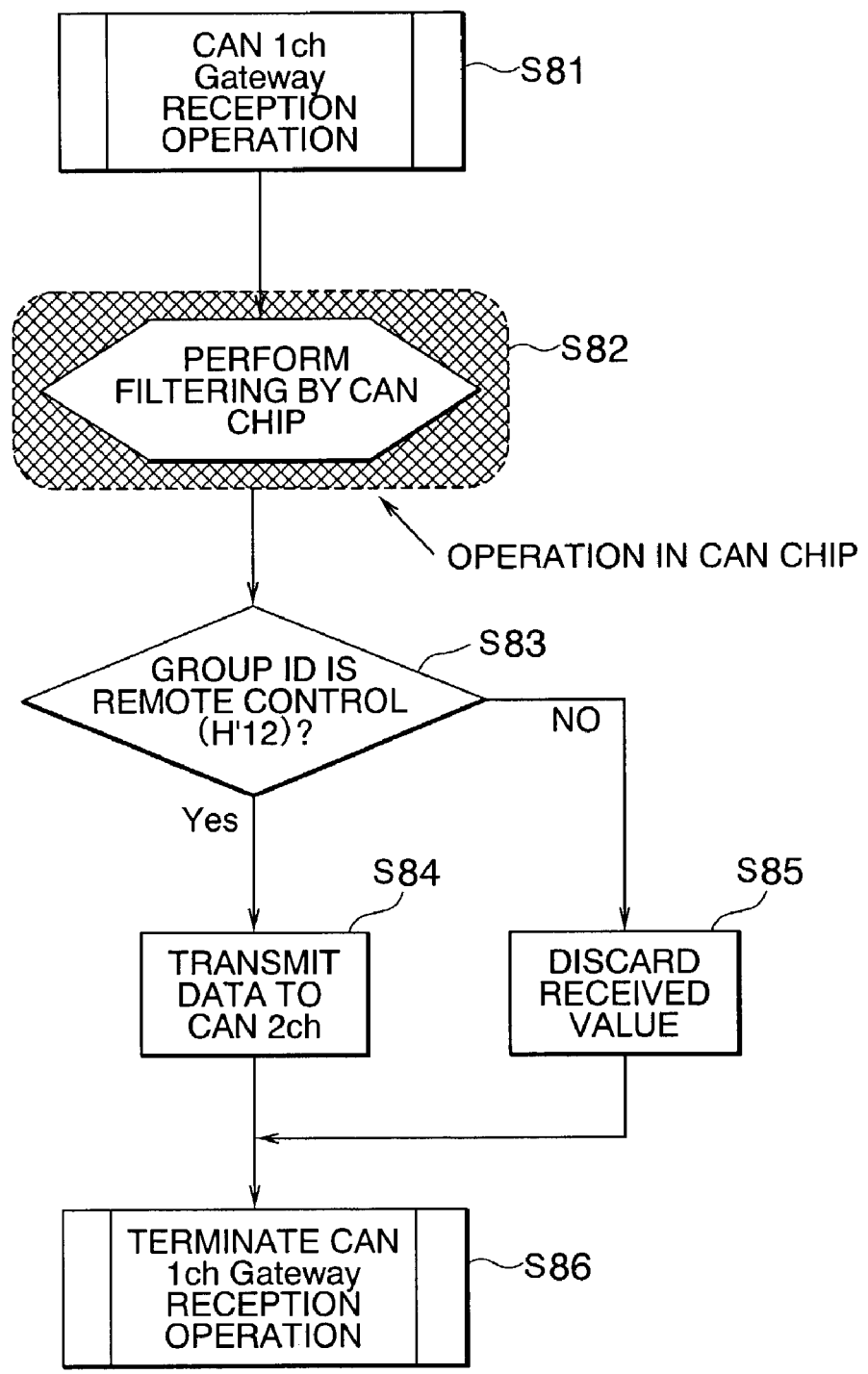
FIG. 8 is a flowchart showing gateway transfer operation using function group IDs in the CAN communication device according to the third embodiment of the present invention.
Figure 10:
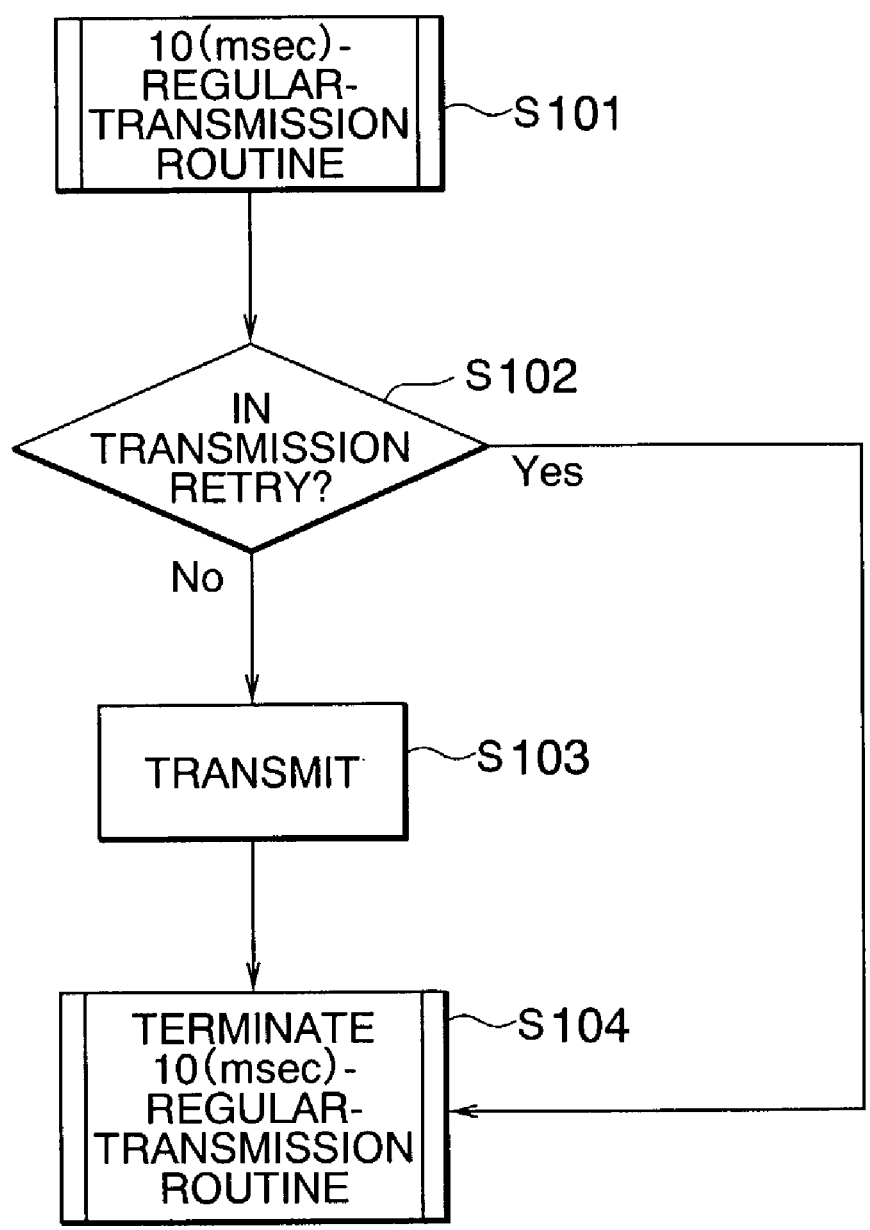
FIG. 10 is a flowchart of data transmission operation in the conventional CAN communication device.
Figure 11:
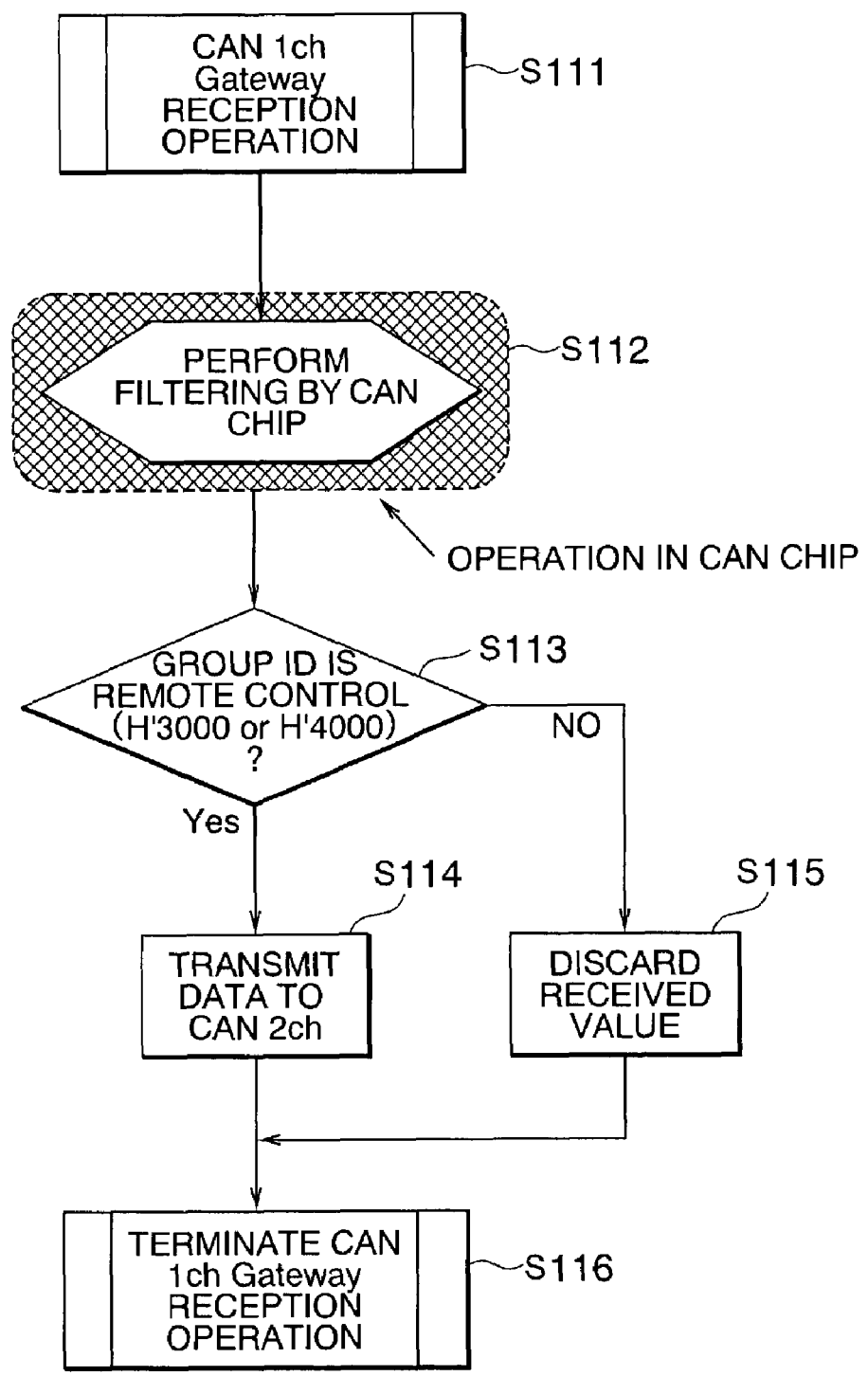
FIG. 11 is a flowchart of gateway transfer operation in the conventional CAN communication device.

FIG. 8 is a flowchart showing gateway transfer operation that uses a function group ID.

The operation in FIG. 8 starts with step S81 in which a gateway node receives data via a CAN 1ch Bus. At step S82, the received data is filtered by a hardware function in a CAN chip, and is stored in a buffer in the CAN chip. In many CAN chips, the number of types of filtering functions provided in the form of hardware is only three at maximum. Thus, filtering for all the IDs cannot be implemented using hardware.

At step S83, a function group ID is "H'12", the received data is transmitted via a CAN 2ch Bus at step S84.

However, at step S83, if the function group ID is not "H'12", the received data is discarded at step S85.

After the processes of step 84 and step 85 have been completed, the series of the gateway transfer operation terminates at step S86, As described above, in the CAN communication device in accordance with the third embodiment has the configuration in which, for example, the two ECUs as shown in FIG. 7 are connected together. According to the configuration, since the function group code is filtered by the gateways, the amounts of communications flowing through the mutual networks can be controlled, and concurrently, processing loads can be reduced when the gateways determine regarding transfer possibility/impossibility. Consequently, overflow in the communication amounts in the individual networks can be prevented.

According to the CAN communication device of the present invention, predetermined function information is grouped in units of a predetermined function, a data-transmission priority is assigned thereto, and a general function group ID is assigned thereto and is set to part of bits of the CAN-ID field. In addition, the communication category code ID for identifying the communication contents is assigned to each of the grouped predetermined function information, and thereby, the general data-transmission priority level is assigned to each of the function groups. Consequently, the probability that a desired free priority code is not available is low. In addition, since a communication category code ID is assigned to each of the grouped functions, the coding method does not fail, even when a multifunction component is developed in the future.

Further, the ID-setting unit sets a base priority level indicative of a priority to be transmitted in units of the grouped predetermined function information to part of the bits of the CAN-ID field independently of the function group ID and the communication category code; each of the nodes further includes a bit adjustment unit that reduces the value of bits representing the base priority assigned to the grouped predetermined function information in one of items of data to which base priorities are set by the ID-setting unit, thereby adjusting the communication priority higher; and the transmission/reception unit preferentially transmits and receives the data containing the base priority with communication priority adjusted by the bit adjustment unit to be higher. As a result, high reliability can be guaranteed in the communication of the grouped predetermined functions base priorities of which have been raised, thereby preventing consecutive arbitration losses according to the base priority bit.

Further, the plurality of nodes includes gateway nodes each having at least a gateway function; the ID-setting unit sets inter-gateway transfer permission information indicative of possibility/impossibility of inter-gateway data transfer for each of the grouped predetermined function information to part of the bits of the CAN-ID field; the transmission/reception unit transmits and receives data containing the inter-gateway transfer permission information set by the ID-setting unit; the ID-analyzing unit analyzes the inter-gateway transfer permission information in the data received by the transmission/reception unit and thereby determines as to possibility/impossibility of communication; and the gateway nodes each include inter-gateway communication units that performs inter-gateway communication when the determination result of the ID-analyzing unit indicates the possibility of the communication. As a result, it is determined as to whether the inter-gateway communication is permitted or not, thereby controlling the communication amount flowing between each network.

What is claimed is:

1. A controller area network (CAN) communication device formed such that a plurality of nodes are connected to communication channels in a controller area network, each of the nodes comprising:
   transmission/reception means for transmitting and receiving data including a CAN-ID field formed of bits containing function information;
   ID-setting means for setting predetermined function information to the bits of the CAN-ID field contained in the data transmitted from the transmission/reception means; and
   ID-analyzing means for analyzing the predetermined function information set in the CAN-ID field included in the data when the data containing the predetermined function information set by the ID-setting means has been received by the transmission/reception means, wherein the ID-setting means groups the predetermined function information in units of a predetermined function, assigns a data-transmission priority, assigns a general function group ID, and assigns a communication category code ID used to identify a communication content to each item of the grouped predetermined function information to be set to part of the bits of the CAN-ID field.

2. A CAN communication device according to claim 1, wherein:
the ID-setting means further sets a base priority level indicative of a priority to be transmitted in units of the grouped predetermined function information to part of the bits of the CAN-ID field independently of the function group ID and the communication category code;
each of the nodes further comprises bit adjustment means that reduces the value of bits representing the base priority assigned to the grouped predetermined function information in one of items of data to which the base priorities are set by the ID-setting means, thereby adjusting the communication priority higher; and
the transmission/reception means preferentially transmits and receives the data containing the base priority with communication priority adjusted by the bit adjustment means to be higher.

3. A CAN communication device according to claim 1, wherein:
the plurality of nodes comprises gateway nodes each having at least a gateway function;
the ID-setting means sets inter-gateway transfer permission information indicative of possibility/impossibility of inter-gateway data transfer for each of the grouped predetermined function information to part of the bits of the CAN-ID field;
the transmission/reception means transmits and receives data containing the inter-gateway transfer permission information set by the ID-setting means;
the ID-analyzing means analyzes the inter-gateway transfer permission information in the data received by the transmission/reception means and thereby determines as to possibility/impossibility of communication; and
the gateway nodes each comprise inter-gateway communication means that performs inter-gateway communication when the determination result of the ID-analyzing means indicates the possibility of the communication.

4. The CAN communication device according to claim 1, wherein the ID-setting means further sets a base priority level indicative of a priority to be transmitted in units of the grouped predetermined function information to part of the bits of the CAN-ID field independently of the function group ID and the communication category code.

5. The CAN communication device according to claim 4, wherein each of the nodes further comprises a bit adjustment means that reduces the value of bits representing the base priority assigned to the grouped predetermined function information in one of items of data to which the base priorities are set by the ID-setting means, thereby adjusting the communication priority higher.

6. The CAN communication device according to claim 1, wherein:
the plurality of nodes comprises gateway nodes each having at least a gateway function; and
the ID-setting means sets inter-gateway transfer permission information indicative of possibility/impossibility of inter-gateway data transfer for each of the grouped predetermined function information to part of the bits of the CAN-ID field.

7. The CAN communication device according to claim 1, wherein said function information comprises at least one of a steering function, an engine condition function, a shift and throttle remote control function, a steering actuator driving function, and a throttle actuator driving function.

8. The CAN communication device according to claim 1, wherein a communication category comprises at least one of a target steering angle, an engine revolutions per minute, a target ship position and a target throttle opening degree, a current steering angle, and a current throttle opening.

9. The CAN communication device according to claim 1, wherein the data-transmission priority is assigned according to the function information.

* * * * *